(12) United States Patent
Liu

(10) Patent No.: US 11,133,899 B2
(45) Date of Patent: Sep. 28, 2021

(54) HYBRID AUTOMATIC REPEAT REQUEST FEEDBACK METHOD AND DEVICE

(71) Applicant: Guangdong OPPO Mobile Telecommunications Corp., Ltd., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 86 days.

(21) Appl. No.: 16/487,076

(22) PCT Filed: Feb. 28, 2017

(86) PCT No.: PCT/CN2017/075241
§ 371 (c)(1),
(2) Date: Aug. 19, 2019

(87) PCT Pub. No.: WO2018/157295
PCT Pub. Date: Sep. 7, 2018

(65) Prior Publication Data
US 2019/0379490 A1    Dec. 12, 2019

(51) Int. Cl.
*H04J 3/16* (2006.01)
*H04L 1/18* (2006.01)
(Continued)

(52) U.S. Cl.
CPC .......... *H04L 1/1819* (2013.01); *H04L 5/0055* (2013.01); *H04W 76/11* (2018.02); *H04W 80/02* (2013.01); *H04W 88/02* (2013.01)

(58) Field of Classification Search
CPC ... H04L 1/1819; H04L 5/0055; H04L 1/1861; H04L 1/1685; H04W 76/11; H04W 80/02; H04W 88/02
See application file for complete search history.

(56) References Cited

U.S. PATENT DOCUMENTS

2008/0008152 A1* 1/2008 Lohr ................... H04L 1/1874
370/342
2008/0279171 A1* 11/2008 Kim ..................... H04L 1/1858
370/346
(Continued)

FOREIGN PATENT DOCUMENTS

CN    101414900 A    4/2009
CN    101414901 A    4/2009
(Continued)

OTHER PUBLICATIONS

Extended EP Search Report for Application No. 17898787.1 dated Jan. 31, 2020.
(Continued)

*Primary Examiner* — Sithu Ko
*Assistant Examiner* — Malick A Sohrab
(74) *Attorney, Agent, or Firm* — Young Basile Hanlon & MacFarlane, P.C.

(57) ABSTRACT

A method and device for hybrid automatic repeat request feedback are provided. The method includes: a terminal device sends data to be transmitted to a network device; if the terminal device determines that feedback information for the data to be transmitted is not received in a first target time period, the terminal device sends feedback request information to the network device, the feedback request information is used for requesting the network device to send feedback information for the data to be transmitted, a start time point of the first target time period is a time point that the terminal device finishes sending the data to be transmitted, and a time length of the first target time period is a first time length.

13 Claims, 3 Drawing Sheets

(51) Int. Cl.
*H04W 76/11* (2018.01)
*H04L 5/00* (2006.01)
*H04W 80/02* (2009.01)
*H04W 88/02* (2009.01)

(56) References Cited

U.S. PATENT DOCUMENTS

| | | | |
|---|---|---|---|
| 2010/0037112 | A1 | 2/2010 | Graumann |
| 2011/0019756 | A1* | 1/2011 | Chun ............... H04L 1/188 375/260 |
| 2016/0112162 | A1 | 4/2016 | Tabet et al. |
| 2016/0233999 | A1 | 8/2016 | Chendamarai Kannan et al. |
| 2016/0261379 | A1* | 9/2016 | Bergstrom .......... H04W 72/042 |
| 2017/0099660 | A1* | 4/2017 | Oh .................. H04L 5/0064 |
| 2019/0245655 | A1* | 8/2019 | Seo ................. H04L 1/1822 |

FOREIGN PATENT DOCUMENTS

| | | |
|---|---|---|
| CN | 101488906 A | 7/2009 |
| CN | 103220091 A | 7/2013 |
| CN | 104348595 A | 2/2015 |
| JP | S62239735 A | 10/1987 |
| JP | 2012239202 A | 12/2012 |
| WO | 2008135238 A1 | 11/2008 |

OTHER PUBLICATIONS

Indian Examination Report for IN Application 201917037123 dated Apr. 30, 2021. (5 pages).
Japanese Office Action with English Translation for JP Application 2019-544823 dated Apr. 2, 2021. (8 pages).
Chinese Office Action with English Translation for CN Application 201780085892.1 dated Jun. 30, 2021. (10 pages).
Communication pursuant to Article 94(3) EPC for EP Application 17898787.1 dated Jun. 28, 2021. (5 pages).

* cited by examiner

100

A terminal device sends data to be transmitted to a network device — S110

If the terminal device determines that feedback information for the data to be transmitted is not received in a first target time period, the terminal device sends feedback request information to the network device, the feedback request information is used for requesting the network device to send feedback information for the data to be transmitted, a start time point of the first target time period is a time point that the terminal device finishes sending the data to be transmitted, and a time length of the first target time period is a first time length — S120

A network device receives data to be transmitted sent by a terminal device — S210

If the network device determines that a target condition is satisfied, the network device sends feedback information for the data to be transmitted to the terminal device — S220

FIG. 2

HYBRID AUTOMATIC REPEAT REQUEST FEEDBACK METHOD AND DEVICE

CROSS-REFERENCE TO RELATED APPLICATION(S)

This application is a 371 application of International Application No. PCT/CN2017/075241, filed on Feb. 28, 2017, the entire disclosure of which is hereby incorporated by reference.

TECHNICAL FIELD

Implementations of the present application relate to a field of communication, and more particularly, to a method and device for hybrid automatic repeat request feedback.

BACKGROUND

Uplink Hybrid Automatic Repeat Request (HARQ) transmission in a Long Term Evolution (LTE) system is synchronous and non-adaptive, wherein synchronization refers to that retransmission is transmitted at a specified fixed time, and non-adaptive refers to that retransmission uses Physical Resource Block (PRB) and Modulation and Coding Scheme (MCS) the same as those for previous transmission. A base station performs a Cyclic Redundancy Check (CRC) on received uplink data to determine whether a retransmission is required. If the CRC is successful and a User Equipment (UE) still has uplink data to be transmitted, the UE performs new transmission. If the CRC fails, the UE performs retransmission.

A conclusion reached at the 95th meeting of the 3rd generation partnership project (3GPP) Radio Access Network (RAN) indicates that uplink HARQ transmission in the future communication system (e.g., 5th Generation, 5G) is asynchronous adaptive HARQ transmission. When a UE sends a data packet to a base station, the base station will carry Downlink Control Information (DCI) in a Physical Downlink Control Channel (PDCCH) to instruct the UE to perform new transmission or retransmission. The base station will continuously schedule the UE and authorize a specific HARQ Process to the UE, and the UE can acquire feedback of the base station by decoding the PDCCH. However, when the base station stops authorizing the UE, the UE will lose feedback of the base station, and the UE cannot determine whether to perform new transmission or retransmission.

Therefore, it is needed to provide a method for HARQ feedback that can be applied to uplink asynchronous adaptive HARQ transmission, so that the UE can still acquire the feedback of the base station even if the base station stops authorizing the UE, thereby improving system efficiency.

SUMMARY

The application provides a method and device for Hybrid Automatic Repeat Request (HARQ) feedback, which can be applied to uplink asynchronous adaptive HARQ transmission.

In a first aspect, a method for hybrid automatic repeat request feedback is provided, which includes: sending, by a terminal device, data to be transmitted to a network device; and sending, by the terminal device, feedback request information to the network device if the terminal device determines that feedback information for the data to be transmitted is not received in a first target time period, wherein the feedback request information is used for requesting the network device to send feedback information for the data to be transmitted, a start time point of the first target time period is a time point that the terminal device finishes sending the data to be transmitted, and a time length of the first target time period is a first time length.

In combination with the first aspect, in one implementation mode of the first aspect, the feedback request information includes an Identification (ID) of the terminal device and an ID of a target HARQ process; wherein sending, by the terminal device, the data to be transmitted to the network device includes: sending, by the terminal device, the data to be transmitted to the network device by using the target HARQ process.

In combination with the first aspect and the above implementation mode, in another implementation mode of the first aspect, wherein sending, by the terminal device, the feedback request information to the network device includes: sending, by the terminal device, the feedback request information to the network device on a dedicated resource, the dedicated resource is a resource allocated by the network device to the terminal device for sending the feedback request information; or, sending, by the terminal device, the feedback request information to the network device on a preset common resource.

Optionally, the preset common resource is a resource used for Grant Free transmission.

In combination with the first aspect and the above implementation mode, in another implementation mode of the first aspect, the method further includes: receiving, by the terminal device, feedback information sent by the network device for the data to be transmitted.

In combination with the first aspect and the above implementation mode, in another implementation mode of the first aspect, the feedback information is acknowledgement (ACK) information, and the ACK information includes the ID of the target HARQ process; wherein receiving, by the terminal device, the feedback information sent by the network device for the data to be transmitted includes: receiving, by the terminal device, a medium access control protocol data unit (MAC PDU) sent by the network device, and the MAC PDU includes the ACK information.

In combination with the first aspect and the above implementation mode, in another implementation mode of the first aspect, the feedback information is ACK information, and the ACK information includes the ID of the target HARQ process and the ID of the terminal device; wherein receiving, by the terminal device, the feedback information sent by the network device for the data to be transmitted includes: receiving, by the terminal device, system information sent by the network device, and the system information includes the ACK information.

In combination with the first aspect and the above implementation mode, in another implementation mode of the first aspect, the feedback information is negative acknowledgement (NACK) information, and the NACK information includes information related to retransmission of the data to be transmitted; wherein receiving, by the terminal device, the feedback information sent by the network device for the data to be transmitted includes: receiving, by the terminal device, a PDCCH sent by the network device, and the PDCCH includes the NACK information.

In combination with the first aspect and the above implementation mode, in another implementation mode of the first aspect, the method further includes: determining, by the terminal device, the first time length according to round-trip time (RTT) of an HARQ process in an existing protocol version; or, determining, by the terminal device, the first time length according to a time length corresponding to the feedback information sent by the network device and received before sending the data to be transmitted to the network device.

In a second aspect, a method for hybrid automatic repeat request (HARQ) feedback method is provided, which includes: receiving, by a network device, data to be transmitted sent by a terminal device; and sending, by the network device, feedback information for the data to be transmitted to the terminal device if the network device determines that a target condition is satisfied.

In combination with the second aspect, in one implementation mode of the second aspect, the target condition is that the network device receives feedback request information sent by the terminal device, and the feedback request information is used for requesting the network device to send feedback information for the data to be transmitted to the terminal device; or, the target condition is that the network device does not need to send downlink data to the terminal device in a second target time period or does not receive a scheduling request sent by the terminal device in the second time period, a start time point of the second target time period is a time point that the network device successfully decodes the data to be transmitted, and the time length of the second target time period is a second time length.

In combination with the second aspect and the above implementation mode, in another implementation mode of the second aspect, the feedback request information includes an identification (ID) of the terminal device and an ID of a target HARQ process; wherein receiving, by the network device, the data to be transmitted sent by the terminal device includes: receiving, by the network device, the data to be transmitted sent by the terminal device using the target HARQ process.

In combination with the second aspect and the above implementation mode, in another implementation mode of the second aspect, the method further includes: receiving, by the network device, the feedback request information sent by the terminal device on a dedicated resource, the dedicated resource is a resource allocated by the network device to the terminal device for sending the feedback request information; or, receiving, by the network device, the feedback request information sent by the terminal device on a preset common resource.

In combination with the second aspect and the above implementation mode, in another implementation mode of the second aspect, the feedback information is acknowledgement (ACK) information, and the ACK information includes the ID of the target HARQ process; wherein sending, by the network device, the feedback information for the data to be sent to the terminal device includes: sending, by the network device, a medium access control protocol data unit (MAC PDU) to the terminal device, and the MAC PDU includes the ACK information.

In combination with the second aspect and the above implementation mode, in another implementation mode of the second aspect, the feedback information is ACK information, and the ACK information includes the ID of the target HARQ process and the ID of the terminal device; wherein sending, by the network device, the feedback information for the data to be transmitted to the terminal device includes: sending, by the network device, system information to the terminal device, and the system information includes the ACK information.

According to the second aspect and the above implementation mode, in another implementation mode of the second aspect, the feedback information is negative acknowledgement (NACK) information, and the NACK information includes information related to retransmission of the data to be transmitted; wherein sending, by the network device, the feedback information for the data to be transmitted to the terminal device includes: sending, by the network device, a physical downlink control channel (PDCCH) to the terminal device, and the PDCCH includes the NACK information.

In a third aspect, a terminal device is provided, which is used for performing the method in the above first aspect or any possible implementation mode of the first aspect. Specifically, the terminal device includes function modules used for executing the method in the first aspect or any possible implementation mode of the first aspect described above.

In a fourth aspect, a network device is provided, which is used for performing the method in the above second aspect or any possible implementation mode of the second aspect. Specifically, the network device includes function modules for executing the method in the second aspect or in any possible implementation mode of the second aspect described above.

In a fifth aspect, a terminal device is provided, which includes a processor, a memory, and a transceiver. The processor, the memory, and the transceiver communicate with each other through internal connection paths to transfer control and/or data signals, so that the terminal device implements the method in the first aspect or any possible implementation mode of the first aspect described above.

In a sixth aspect, a network device is provided, which includes a processor, a memory, and a transceiver. The processor, the memory, and the transceiver communicate with each other through internal connection paths to transfer control and/or data signals, so that the network device implements the method in the second aspect or any possible implementation mode of the second aspect described above.

In a seventh aspect, a computer readable medium is provided for storing a computer program. The computer program includes instructions used for implementing the method of the first aspect or the method of any possible implementation mode of the first aspect.

In an eighth aspect, a computer readable medium is provided for storing a computer program. The computer program includes instructions used for implementing the method of the second aspect or the method of any possible implementation mode of the second aspect.

BRIEF DESCRIPTION OF DRAWINGS

FIG. 1 is a schematic flow chart of a method for hybrid automatic repeat request feedback according to an implementation of the present application.

FIG. 2 is a schematic flow chart of a method for hybrid automatic repeat request feedback according to another implementation of the present application.

DETAILED DESCRIPTION

Figure 3:
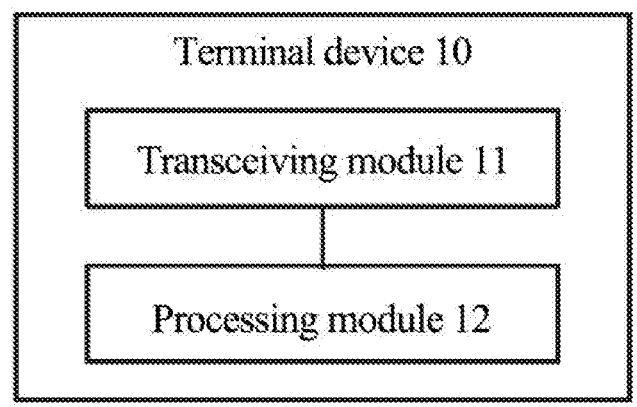
FIG. 3 is a schematic block diagram of a terminal device according to an implementation of the present application.

Technical schemes in implementations of the present application will be clearly and completely described below with reference to the drawings in the implementations of the present application.

It should be understood that the technical solutions of the implementations of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a 5G system, or a New Radio (NR) System.

In implementations of the present application, a terminal device may include, but not limited to, a Mobile Station (MS), a Mobile Terminal, a Mobile Phone, User Equipment (UE), a handset, portable device, a vehicle, and so on. The terminal device may communicate with one or more core networks through a Radio Access Network (RAN). For example, the terminal device may be a Mobile Phone (or "Cellular" phone), a computer with wireless communication functions, etc., and the terminal device may further be a portable, pocket, handheld, computer built-in or on-board mobile device.

In the implementations of the present application, a network device is a device deployed in a wireless access network to provide wireless communication functions for a terminal device. The network device may be a base station, which may include various forms of macro base stations, micro base stations, relay stations, access points, etc. In systems adopting different radio access technologies, name of a device with base station function may be different. For example, in a LTE network, it is called evolved node B (eNB or eNodeB), and in 3rd Generation (3G) network, it is called node B, etc.

FIG. 1 shows a method for hybrid automatic repeat request feedback according to an implementation of the present application. As shown in FIG. 1, the method 100 includes acts S110 and S120.

In S110, a terminal device sends data to be transmitted to a network device.

In S120, if the terminal device determines that feedback information for the data to be transmitted is not received in a first target time period, the terminal device sends feedback request information to the network device, the feedback request information is used for requesting the network device to send feedback information for the data to be transmitted, a start time point of the first target time period is a time point that the terminal device finishes sending the data to be transmitted, and a time length of the first target time period is a first time length.

According to a method for HARQ feedback of the present application, after a terminal device sends data to be transmitted to a network device, the terminal device determines whether to send feedback request information to the network device according to whether feedback information sent by the network device for the data to be transmitted is received in a target time period, which can be applied to a communication system adopting asynchronous adaptive HARQ in uplink, and even if that the network device stops authorizing the terminal device, the terminal device can still acquire the feedback information of the network device by sending the feedback request information, thereby improving system efficiency.

It can be understood that, according to the feedback method in the prior art, when data to be transmitted is a last piece of data to be transmitted that the terminal device needs to send to the network device, if the network device successfully decodes the last piece of data to be transmitted, the network device will stop scheduling the terminal device, which causes the terminal device to be unable to know whether the last piece of data to be transmitted needs to be retransmitted or not, such that the terminal device will store the last piece of data to be transmitted in the retransmission buffer all the time, and the resource is wasted and system efficiency is affected. However, according to the method for HARQ feedback of the implementation of the present application, if the terminal device does not receive feedback of the network device in a first target time period which starts from a time point that the terminal device finishes sending the last piece of data to be transmitted, the terminal device sends feedback request information to the network device, requesting the network device to send feedback information for the last piece of data to be transmitted, thereby avoiding waste of resource and improving system efficiency.

Optionally, in S110, the terminal device sends the data to be transmitted to the network device by using a target HARQ process. In this case, in S120, the feedback request information sent by the terminal device to the network device includes an ID of the terminal device and an ID of the target HARQ process. According to the ID of the terminal device and the ID of the target HARQ process, the network device may determine that feedback is required for the data to be transmitted that is received, or it may be understood that the network device needs to send feedback information corresponding to the target HARQ process to the terminal device.

Optionally, in S120, the terminal device sends feedback request information to the network device on a dedicated resource or a pre-configured common resource, wherein the dedicated resource may be a resource allocated by the network device to the terminal device for sending feedback request information, for example, the network device may allocate this dedicated resource to the terminal device through system information. The pre-configured common resource may be a resource pre-configured by the network device for Grant-Free transmission.

It can be understood that after the terminal device sends the feedback request information to the network device, the terminal device receives feedback information sent by the network device for the data to be transmitted.

Specifically, in some implementations, if the network device correctly decodes the data to be transmitted, the feedback information is Acknowledgement (ACK) information including the ID of the target HARQ process, and the terminal device may determine that ACK information received is the ACK information for the data to be transmitted according to the ID of the target HARQ process, and determine that retransmission of the data to be transmitted is not required.

Optionally, the terminal device receives a Medium Access Control (MAC) Protocol Data Unit (PDU) sent by the network device, and the MAC PDU includes ACK information. For example, ACK information is carried in a Subheader portion of the MAC PDU, or ACK information is carried in a MAC Control Element (CE) portion, or ACK information is carried in a MAC Service Data Unit (SDU) portion.

Alternatively, the terminal device receives system information sent by the network device, and the system information includes ACK information. At this time, the ACK information includes the ID of the terminal device in addition to the ID of the target HARQ process.

Specifically, in other implementations, if the network device fails to decode the data to be transmitted, feedback information is Negative Acknowledgment (NACK) information, and the NACK information includes information related to retransmitting the data to be transmitted. The information related to retransmission of the data to be transmitted includes information such as a Modulation and Coding Scheme (MCS), a Physical Resource Block (PRB) and the like required for retransmission of the data to be transmitted. After receiving the NACK information, the terminal device retransmits the data to be transmitted to the network device according to the information related to retransmitting the data to be transmitted.

Optionally, the terminal device receives a Physical Downlink Control Channel (PDCCH) sent by the network device, and the PDCCH carries the NACK information.

In all the above implementations, optionally, the first time length may be a time length agreed in a protocol, or the first time length may be a time length determined by the terminal device. For example, the terminal device may determine a time length of Round-Trip Time (RTT) in the prior art as the first time length, or the terminal device may determine the first time length according to a time length corresponding to the feedback information sent by the network device and received before the terminal device sends the data to be transmitted to the network device.

For example, the terminal device has already sent three data packets to the network device before sending the data to be transmitted to the network device, a time length between a time point that the terminal device finished sending a first data packet and a time point that the terminal device received feedback information for the first data packet is 8 ms, a time length between a time point that the terminal device finished sending a second data packet and a time point that the terminal device received feedback information for the second data packet is 10 ms, and a time length between a time point that the terminal device finished sending a third data packet and a time point that the terminal device received feedback information for the second data packet is 12 ms. The terminal device may determine an average value of above three time lengths as the first time length, or the terminal device may determine a maximum value or a minimum value of the three time lengths as the first time length.

In all the above implementations, optionally, the terminal device is provided with a timer, and when the terminal device finishes sending data to be transmitted, the timer starts timing, and the timing length is the first time length.

A method for hybrid automatic repeat request feedback according to an implementation of the present application is described in detail above from a terminal device side in combination with FIG. 1, and a method for hybrid automatic repeat request feedback according to an implementation of the present application will be described in detail below from a network device side in combination with FIG. 2. It should be understood that interactions between a network device and a terminal device described from the network device side is the same as that described from the terminal device side, and relevant descriptions are omitted appropriately to avoid repetition.

FIG. 2 is a method for hybrid automatic repeat request feedback according to another implementation of the present application. As shown in FIG. 2, the method 200 includes acts S210 and S220.

In S210, a network device receives data to be transmitted sent by a terminal device.

In S220, if the network device determines that a target condition is satisfied, the network device sends feedback information for the data to be transmitted to the terminal device.

According to a method for HARQ feedback of the present application, after receiving data to be transmitted sent by a terminal device, a network device determines whether to send feedback information to the terminal device for the data to be transmitted according to whether a target condition is satisfied, which can be applied to a communication system adopting asynchronous adaptive HARQ in uplink, and even if the network device stops authorizing the terminal device, the terminal device can still acquire the feedback information of the network device, thereby improving system efficiency.

In an implementation of the present application, optionally, the target condition is that the network device receives feedback request information sent by the terminal device, and the feedback request information is used for requesting the network device to send feedback information for the data to be transmitted to the terminal device; or, the target condition is that the network device does not need to send downlink data to the terminal device in a second target time period or does not receive a scheduling request sent by the terminal device in the second target time period, a start time point of the second target time period is a time point that the network device successfully decodes the data to be transmitted, and a time length of the second target time period is a second time length.

Optionally, that the network device does not need to send downlink data to the terminal device in a second target time period or does not receive the scheduling request sent by the terminal device in the second target time period can be understood as that the network device does not need to send a PDCCH to the terminal device in the second target time period.

Optionally, the network device may determine the second time length according to a time length between a time point when a piece of data is successfully decoded and a time point when feedback information for the piece of data is sent, before the data to be transmitted is successfully decoded.

In an implementation of the present application, optionally, the feedback request information includes an ID of the terminal device and an ID of a target HARQ process.

Herein S210 specifically is that the network device receives the data to be transmitted sent by the terminal device using the target HARQ process.

In an implementation of the application, optionally, the method further includes: the network device receives the feedback request information sent by the terminal device on a dedicated resource, the dedicated resource is a resource allocated by the network device to the terminal device for sending the feedback request information; or, the network device receives the feedback request information sent by the terminal device on a preset common resource.

In an implementation of the present application, optionally, the feedback information is acknowledgement (ACK) information, and the ACK information includes the ID of the target HARQ process.

Herein in S220, the network device sends feedback information for the data to be transmitted to the terminal device, including: the network device sends a medium access control protocol data unit (MAC PDU) to the terminal device, and the MAC PDU includes the ACK information.

In an implementation of the present application, optionally, the feedback information is ACK information, and the ACK information includes the ID of the target HARQ process and the ID of the terminal device.

Herein in S220, the network device sends feedback information for the data to be transmitted to the terminal device, including: the network device sends system information to the terminal device, and the system information includes the ACK information.

In the implementation of the present application, optionally, the feedback information is negative acknowledgement (NACK) information, and the NACK information includes information related to retransmission of the data to be transmitted.

Herein in S220, the network device sends feedback information for the data to be transmitted to the terminal device, including: the network device sends a physical downlink control channel (PDCCH) to the terminal device, and the PDCCH includes the NACK information.

Methods for hybrid automatic repeat request feedback according to implementations of the present application are described in detail above with reference to FIG. 1 and FIG. 2. A terminal device according to an implementation of the present application will be described in detail below with reference to FIG. 3. As shown in FIG. 3, a terminal device 10 includes a transceiving module 11 and a processing module 12.

The transceiving module 11 is used for sending data to be transmitted to a network device.

The processing module 12 is used for determining whether the transceiving module 11 receives feedback information for the data to be transmitted in a first target time period, a start time point of the first target time period is a time point that the transceiving module 11 finishes sending the data to be transmitted, and a time length of the first target time period is a first time length.

The transceiving module 11 is further used for sending feedback request information to the network device if the processing module 12 determines that the transceiving module 11 does not receive feedback information for the data to be transmitted in the first target time period, and the feedback request information is used for requesting the network device to send feedback information for the data to be transmitted.

Therefore, according to an implementation of the present application, after a terminal device sends data to be transmitted to a network device, the terminal device determines whether to send feedback request information to the network device according to whether it receives feedback information sent by the network device for the data to be transmitted in a target time period, which can be applied to a communication system adopting asynchronous adaptive HARQ in uplink, and even if the network device stops authorizing the terminal device, the terminal device can still acquire feedback information of the network device by sending feedback request information, thus improving system efficiency.

In an implementation of the present application, optionally, the feedback request information includes an ID of the terminal device and an ID of a target HARQ process.

Herein the transceiving module 11 is specifically used for sending the data to be transmitted to the network device by using the target HARQ process.

In an implementation of the present application, optionally, the transceiving module 11 is specifically used for sending the feedback request information to the network device on a dedicated resource, the dedicated resource being a resource allocated by the network device to the terminal device for sending the feedback request information; or, sending the feedback request information to the network device on a preset common resource.

In an implementation of the present application, optionally, the transceiving module 11 is further used for receiving feedback information for the data to be transmitted sent by the network device.

In an implementation of the present application, optionally, the feedback information is ACK information, and the ACK information includes the ID of the target HARQ process.

Herein the transceiving module 11 is specifically used for receiving a medium access control protocol data unit (MAC PDU) sent by the network device, and the MAC PDU includes the ACK information.

In an implementation of the present application, optionally, the feedback information is ACK information, and the ACK information includes the ID of the target HARQ process and the ID of the terminal device.

Herein the transceiving module 11 is specifically used for receiving system information sent by the network device, and the system information includes the ACK information.

In an implementation of the present application, optionally, the feedback information is negative acknowledgement (NACK) information, and the NACK information includes information related to retransmission of the data to be transmitted.

Herein the transceiving module 11 is specifically used for receiving a physical downlink control channel (PDCCH) sent by the network device, and the PDCCH includes the NACK information.

In an implementation of the present application, optionally, the processing module 12 is further used for determining the first time length according to round-trip time (RTT) of an HARQ process in an existing protocol version; or, the first time length is determined according to a time length corresponding to the feedback information sent by the network device and received by the transceiving module 11 before sending the data to be transmitted to the network device.

The terminal device according to implementation of the present application may refer to the flow of the method 100 corresponding to the implementation of the present application, and various units/modules in the terminal device and other operations and/or functions described above are respectively for realizing the corresponding flow in the method 100, and will not be repeated herein for brevity.

Figure 4:
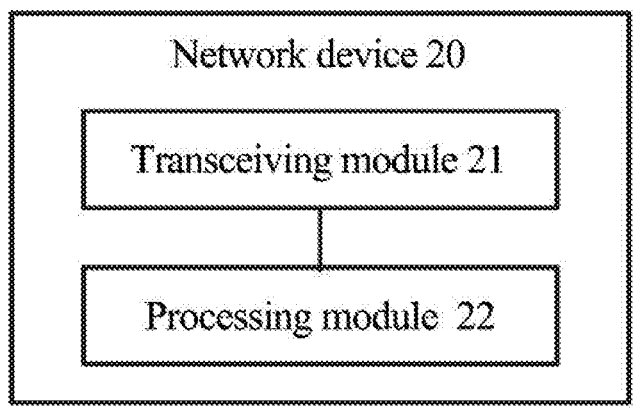
FIG. 4 is a schematic block diagram of a network device according to an implementation of the present application.

FIG. 4 shows a network device according to an implementation of the present application. As shown in FIG. 4, a network device 20 includes a transceiving module 21 and a processing module 22.

The transceiving module 21 is used for receiving data to be transmitted sent by a terminal device.

The processing module 22 is used for determining whether the network device satisfies a target condition.

The transceiving module 21 is further used for sending feedback information for the data to be transmitted to the terminal device if the processing module 22 determines that the network device satisfies the target condition.

Therefore, according to the implementation of the present application, after receiving data to be transmitted sent by a terminal device, a network device determines whether to send feedback information for the data to be transmitted to the terminal device according to whether a target condition is satisfied, which can be applied to a communication system adopting asynchronous adaptive HARQ in uplink, and enables the terminal device to acquire feedback information of the network device even if the network device stops authorizing the terminal device, thereby improving system efficiency.

In an implementation of the present application, optionally, the target condition is that the transceiving module receives feedback request information sent by the terminal device, and the feedback request information is used for requesting the network device to send feedback information for the data to be transmitted to the terminal device; or, the target condition is that the transceiving module does not need to send downlink data to the terminal device in a second target time period or does not receive a scheduling request sent by the terminal device in the second target time period, a start time point of the second target time period is a time point that the processing module successfully decodes the data to be transmitted, and a time length of the second target time period is a second time length.

In an implementation of the present application, optionally, the feedback request information includes an ID of the terminal device and an ID of a target HARQ process.

Herein the transceiving module 21 is specifically used for receiving the data to be transmitted sent by the terminal device using the target HARQ process.

In an implementation of the present application, optionally, the transceiving module 21 is further used for receiving the feedback request information sent by the terminal device on a dedicated resource, the dedicated resource being a resource allocated by the network device to the terminal device for sending the feedback request information; or, receiving the feedback request information sent by the terminal device on a preset common resource.

In an implementation of the present application, optionally, the feedback information is ACK information, and the ACK information includes the ID of the target HARQ process.

Herein the transceiving module 21 is specifically used for sending a medium access control protocol data unit (MAC PDU) to the terminal device, and the MAC PDU includes the ACK information.

In an implementation of the present application, optionally, the feedback information is ACK information, and the ACK information includes the ID of the target HARQ process and the ID of the terminal device.

Herein the transceiving module 21 is specifically used for sending system information to the terminal device, and the system information includes the ACK information.

In an implementation of the present application, optionally, the feedback information is negative acknowledgement (NACK) information, and the NACK information includes information related to retransmission of the data to be transmitted.

Herein the transceiving module 21 is specifically used for sending a physical downlink control channel (PDCCH) to the terminal device, and the PDCCH includes the NACK information.

Figure 5:
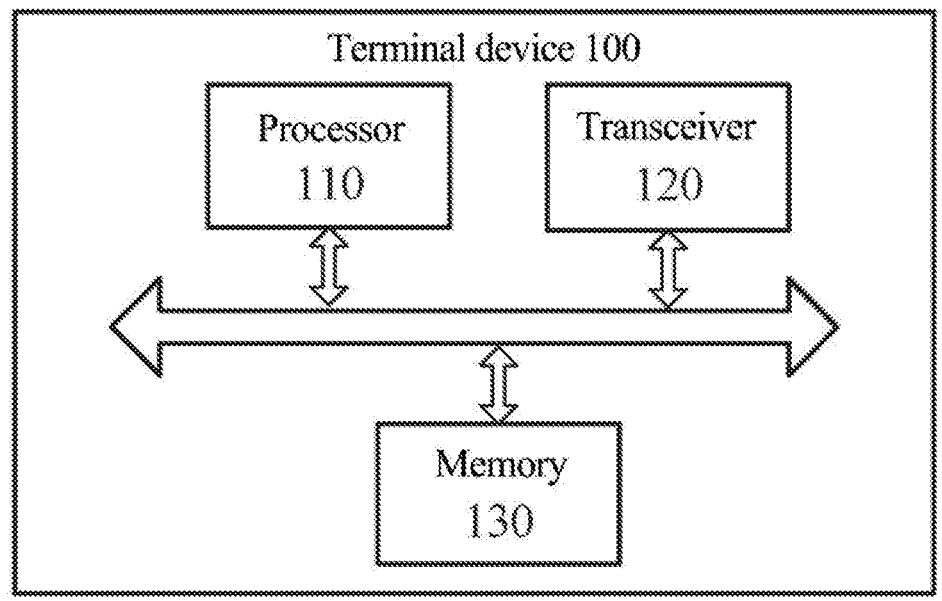
FIG. 5 is a schematic block diagram of a terminal device according to another implementation of the present application.

FIG. 5 shows a terminal device according to another implementation of the present application. As shown in FIG. 5, a terminal device 100 includes a processor 110 and a transceiver 120. The processor 110 is connected to the transceiver 120. Optionally, the terminal device 100 further includes a memory 130, the memory 130 is connected to the processor 110, wherein the processor 110, the memory 130, and the transceiver 120 may communicate with each other through an internal connection path. The transceiver 120 is used for sending data to be transmitted to a network device. The processor 110 is used for determining whether the transceiver 120 receives feedback information for the data to be transmitted in a first target time period, a start time point of the first target time period is a time point that the transceiver 120 finishes transmitting the data to be transmitted, and a time length of the first target time period is a first time length. The transceiver 120 is further used for sending feedback request information to the network device if the processor 110 determines that the transceiver 120 does not receive feedback information for the data to be transmitted in the first target time period, and the feedback request information is used for requesting the network device to send feedback information for the data to be transmitted.

Therefore, according to the implementation of the present application, after a terminal device sends data to be transmitted to a network device, the terminal device determines whether to send feedback request information to the network device according to whether it receives feedback information sent by the network device for the data to be transmitted in a target time period, which can be applied to a communication system adopting asynchronous adaptive HARQ in uplink, and even if the network device stops authorizing the terminal device, the terminal device can still acquire feedback information of the network device by sending feedback request information, thus improving system efficiency.

The terminal device 100 according to the implementation of the present application may refer to the terminal device 10 corresponding to the implementation of the present application, and various units/modules in the terminal device and other operations and/or functions described above are respectively for realizing the corresponding flow in the method 100, and will not be repeated here for brevity.

Figure 6:
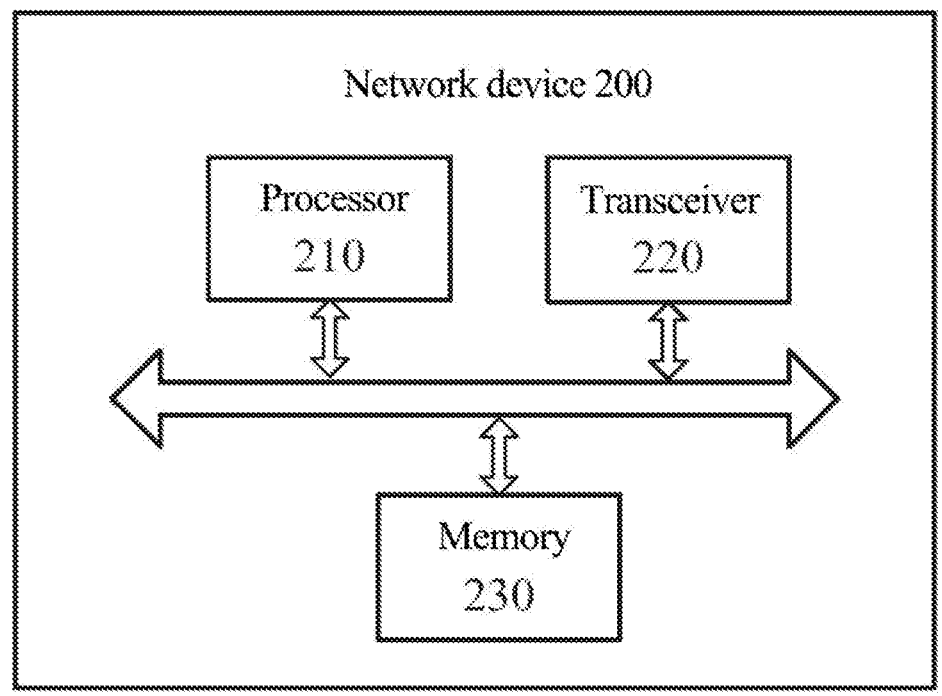
FIG. 6 is a schematic block diagram of a network device according to another implementation of the present application.

FIG. 6 shows a schematic block diagram of a network device according to another implementation of the present application. As shown in FIG. 6, a network device 200 includes a processor 210 and a transceiver 220, the processor 210 is connected to the transceiver 220, optionally, the network device 200 further includes a memory 230 connected to the processor 210, wherein the processor 210, the memory 230, and the transceiver 220 may communicate with each other through an internal connection path. The transceiver 220 is used for receiving data to be transmitted sent by a terminal device. The processor 210 is used for determining whether the network device satisfies a target condition; and the transceiver 210 is further used for sending feedback information for the data to be transmitted to the terminal device if the processor 210 determines that the network device satisfies the target condition.

Therefore, according to the implementation of the present application, after receiving data to be transmitted sent by a terminal device, a network device determines whether to send feedback information for the data to be transmitted to the terminal device according to whether a target condition is satisfied, which can be applied to a communication system adopting asynchronous adaptive HARQ in uplink, and enables the terminal device to acquire feedback information of the network device even if the network device stops authorizing the terminal device, thereby improving system efficiency.

The network device 200 according to the implementation of the present application may refer to the network device 20 corresponding to the implementation of the present application, and various units/modules in the network device and other operations and/or functions described above are respectively for realizing the corresponding flow in the method 200, and will not be repeated here for brevity.

It should be understood that the processor in implementations of the present application may be an integrated circuit chip with a capability for processing signals. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present application. The general purpose processor may be a microprocessor or the processor may be any conventional processor or the like.

The storage in implementations of the present application may be a transitory memory or non-transitory memory, or may include both transitory memory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

Those of ordinary skill in the art will appreciate that the exemplary units and algorithm acts described in connection with the implementations disclosed herein can be implemented in electronic hardware, or a combination of computer software and electronic hardware. Whether these functions are implemented in hardware or software depends on a specific application and design constraint of the technical solution. Skilled artisans may use different methods to realize the described functions for each particular application, but such realization should not be considered to be beyond the scope of the present application.

Those skilled in the art may clearly understand that for convenience and conciseness of description, specific working process of the system, apparatus and unit described above may refer to corresponding process in the aforementioned implementations of methods, and details are not described herein again.

In several implementations provided by the present application, it should be understood that the disclosed system, apparatus and method may be implemented in other ways. The apparatus implementations described above are only illustrative, for example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the implementations.

In addition, various functional units in various implementations of the present application may be integrated in one processing unit, or various units may be physically present separately, or two or more units may be integrated in one unit.

The function may be stored in a computer readable storage medium if implemented in a form of software functional unit and sold or used as a separate product. Based on this understanding, the technical solution of the implementation of the present application, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present application. The aforementioned storage media include U disk, mobile hard disk, read-only memory (ROM), random access memory (RAM), magnetic disk or optical disk, and other media capable of storing program codes.

The foregoing are merely exemplary implementations of the present application, but the protection scope of the present application is not limited thereto. Any person skilled in the art can easily conceive variations or substitutions within the technical scope disclosed by the present application, which should be included within the protection scope of the present application. Therefore, the protection scope of the present application should be subject to the protection scope of the claims.

What is claimed is:

1. A method for hybrid automatic repeat request (HARQ) feedback, comprising:
    sending, by a terminal device, data to a network device;
    in case that a last packet of the data is sent to the network device, starting, by the terminal device, a timer to determine whether feedback information for the last packet is not received in a first target time period, wherein the first target time period is determined according to a time length corresponding to previous feedback information sent by the network device and received by a transceiver of the terminal device before sending the last packet to the network device;
    sending, by the terminal device, feedback request information to the network device on a preset common resource, which is a resource used for Grant Free transmission, when the terminal device determines that the feedback information for the last packet is not received in the first target time period, in case that the network device stops authorizing the terminal device, wherein the feedback request information is used for requesting the network device to send the feedback information for the last packet, and wherein a start time point of the first target time period is a time point that the terminal device finishes sending the data; and
    determining, by the terminal device, the first target time period according to at least one of: round-trip time (RTT) of an HARQ process in an existing protocol version, or a time length corresponding to the feedback information sent by the network device and received by the terminal device before sending the data to the network device.

2. The method of claim 1, wherein the feedback request information comprises an identification (ID) of the terminal device and an ID of a target HARQ process;
wherein sending, by the terminal device, the data to the network device comprises:
sending, by the terminal device, the data to the network device by using the target HARQ process.

3. The method of claim 2, further comprising:
receiving, by the terminal device, the feedback information sent by the network device for the last packet.

4. The method of claim 3, wherein the feedback information is acknowledgement (ACK) information, and the ACK information comprises the ID of the target HARQ process;
wherein receiving, by the terminal device, the feedback information sent by the network device for the last packet comprises:
receiving, by the terminal device, a medium access control protocol data unit (MAC PDU) sent by the network device, and the MAC PDU comprises the ACK information.

5. The method of claim 3, wherein the feedback information is ACK information, and the ACK information comprises the ID of the target HARQ process and the ID of the terminal device;
wherein receiving, by the terminal device, the feedback information sent by the network device for the last packet comprises:
receiving, by the terminal device, system information sent by the network device, and the system information comprises the ACK information.

6. The method of claim 3, wherein the feedback information is negative acknowledgement (NACK) information, and the NACK information comprises information related to retransmission of the last packet;
wherein receiving, by the terminal device, the feedback information sent by the network device for the last packet comprises:
receiving, by the terminal device, a physical downlink control channel (PDCCH) sent by the network device, and the PDCCH comprises the NACK information.

7. A terminal device, comprising: a processor and a transceiver; wherein
the transceiver is configured to send data to a network device;
the processor is configured to, in case that a last packet of the data is sent to the network device, start a timer to determine whether feedback information for the last packet is not received in a first target time period, wherein the first target time period is determined according to a time length corresponding to previous feedback information sent by the network device and received by the transceiver before sending the last packet to the network device;
the transceiver is further configured to send feedback request information to the network device on a preset common resource, which is a resource used for Grant Free transmission, when the processor determines that the transceiver does not receive the feedback information for the last packet in the first target time period, in case that the network device stops authorizing the terminal device, wherein the feedback request information is used for requesting the network device to send the feedback information for the last packet, and wherein a start time period of the first target time period is a time point that the terminal device finishes sending the data; and
the processor is further configured to determine the first target time period according to at least one of:
round-trip time (RTT) of an HARQ process in an existing protocol version, or
a time length corresponding to the feedback information sent by the network device and received by the transceiver before sending the data to the network device.

8. The terminal device of claim 7, wherein the feedback request information comprises an identification (ID) of the terminal device and an ID of a target HARQ process; and
wherein the transceiver is configured to:
send the data to the network device by using the target HARQ process.

9. The terminal device of claim 8, wherein the transceiver is further configured to:
receive the feedback information sent by the network device for the last packet.

10. The terminal device of claim 9, wherein the feedback information is ACK information, and the ACK information comprises the ID of the target HARQ process;
wherein the transceiver is configured to:
receive a medium access control protocol data unit (MAC PDU) sent by the network device, the MAC PDU comprising the ACK information.

11. The terminal device of claim 9, wherein the feedback information is ACK information, and the ACK information comprises the ID of the target HARQ process and the ID of the terminal device;
wherein the transceiver is configured to:
receive system information sent by the network device, the system information comprising the ACK information.

12. The terminal device of claim 9, wherein the feedback information is NACK information, and the NACK information comprises information related to retransmission of the last packet;
wherein the transceiver is configured to:
receive a PDCCH sent by the network device, the PDCCH comprising the NACK information.

13. A non-transitory computer readable medium, storing a computer program which, when being executed by a computer, causes the computer to:
send data to a network device through a terminal device;
in case that a last packet of the data is sent to the network device, start a timer to determine whether feedback information for the last packet is not received in a first target time period, wherein the first target time period is determined according to a time length corresponding to previous feedback information sent by the network device and received by a transceiver of the terminal device before sending the last packet to the network device;
send feedback request information to the network device on a preset common resource, which is a resource used for Grant Free transmission, when the terminal device determines that the feedback information for the last packet is not received in a first target time period, in case that the network device stops authorizing the terminal device, wherein the feedback request information is used for requesting the network device to send the feedback information for the last packet, and wherein a start time point of the first target time period is a time point that the terminal device finishes sending the data; and determine the first target time period according to at least one of:
   round-trip time (RTT) of an HARQ process in an existing protocol version, or
   a time length corresponding to the feedback information sent by the network device and received by the terminal device before sending the data to the network device.

* * * * *